United States Patent [19]

Bakker et al.

[11] 3,928,530

[45] Dec. 23, 1975

[54] SELECTIVE PRECIPITATION OF COBALT AND NICKEL AMINE COMPLEXES

[75] Inventors: Herman F. Bakker, Clarkson, Canada; Malcolm C. Bell, Sudbury, Canada

[73] Assignee: The International Nickel Company, Inc., New York, N.Y.

[22] Filed: Dec. 5, 1974

[21] Appl. No.: 529,817

Related U.S. Application Data

[63] Continuation-in-part of Ser. No. 380,562, July 19, 1973, abandoned.

[52] U.S. Cl. .................. 423/140; 423/141; 75/103; 75/108; 75/119
[51] Int. Cl.² .................. C01G 51/12; C22B 23/04
[58] Field of Search ...... 423/140, 145, 141; 75/103, 75/108, 119

[56] References Cited
UNITED STATES PATENTS

| | | |
|---|---|---|
| 2,506,159 | 5/1950 | Mantell .................................. 75/119 |
| 2,728,636 | 12/1955 | Van Hare et al. ................. 75/119 X |
| 2,829,963 | 4/1958 | Hixson et al. .......................... 75/103 |
| 3,848,054 | 11/1974 | Wiewiorowski ..................... 423/140 |

*Primary Examiner*—G. Ozaki
*Attorney, Agent, or Firm*—Francis J. Mulligan, Jr.; Ewan C. MacQueen

[57] ABSTRACT

A process for separating nickel and cobalt copresent in ammine chloride solutions wherein divalent cobalt is oxidized to the trivalent state by air or oxygen. The solution is then maintained at a temperature between about 60° and 120°C. to precipitate cobalt as trivalent cobalt chloropentammine chloride. Nickel is thereafter separated from the solution by precipitation as nickel hexammine chloride.

7 Claims, No Drawings

SELECTIVE PRECIPITATION OF COBALT AND NICKEL AMINE COMPLEXES

This application is a continuation-in-part application of U.S. Patent Application Ser. No. 380,562 filed July 19, 1973 now abandoned.

The present invention is concerned with a process for separating nickel and cobalt, and, more particularly, with separating nickel and cobalt from each other when copresent in ammine solutions.

Very often metalliferous material is leached with aqueous ammonia to produce aqueous ammoniacal leach solutions containing nickel and cobalt, for example, in the form of water-soluble ammine complexes. Commonly, but not necessarily, such aqueous leach solutions and similar solutions of other derivation contain relatively large amounts of nickel and smaller amounts of cobalt. It is advantageous to provide a process for recovering nickel and cobalt individually, in good yield and in relatively pure form from such solutions at little or no reagent expense.

It has now been discovered that by means of a special process, nickel and cobalt, copresent in aqueous ammoniacal solutions, can be separated one from another in good yield and in pure form and with minimal expense for reagents.

It is an object of the present invention to provide a process for selectively precipitating a cobalt ammine complex from an aqueous ammoniacal solution containing copresent nickel and cobalt.

It is another object of the present invention to provide a process for separating and recovering nickel and cobalt values from aqueous ammoniacal solutions containing copresent nickel and cobalt.

Other objects and advantages will become apparent from the following description.

Generally speaking, the present invention comprises a process for precipitating cobalt values from an aqueous ammine solution containing chloride ion, ammonium ion and copresent nickel and cobalt, which comprises oxidizing the cobalt in solution to the trivalent state and precipitating trivalent cobalt chloropentammine chloride by maintaining the temperature of the aqueous ammine solution at about 60° to about 120°C. during the precipitation operation. Oxidation can be accomplished by saturating the ammine solution with gaseous oxygen at temperatures ranging from room temperature up to about 120°C. It will be appreciated that when the oxidation is accomplished, for example, by passing air through the ammine solution at room temperature or slightly higher, e.g., at temperatures of about 10° to about 40°C., it will be necessary to heat the solution to at least about 60°C. in order to precipitate trivalent cobalt chloropentammine chloride. On the other hand, when oxidizing with relatively concentrated oxygen at temperatures above 60°C., for example, at about 100° to 110°C., precipitation of the cobalt chloropentammine chloride will occur simultaneously with the oxidation operation. When operating at such high temperatures, it is advantageous to employ superatmospheric pressure so as to avoid excessive loss of water and ammonia from the ammine solution.

While applicants are not to be bound by any theoretical explanation of the process of the present invention, it is believed that reaction occurs between molecular oxygen and cobalt II hexammine chloride-containing solution to form a trivalent cobalt complex. This complex is soluble in water and is relatively stable at temperatures below about 60°C. Above about 60°C. this complex decomposes to form the cobalt III chloropentammine radical, which in the presence of chloride ion and ammonium chloride, precipitates as cobalt III chloropentammine chloride.

Ammine solutions treatable in accordance with the present invention contain about 0.5 to about 50 grams per liter (gpl) of cobalt, about 0.5 to about 50 gpl of nickel, about 10 to about 350 gpl ammonium chloride, ammonia in an amount such that the mole ratio of ammonia to total nickel plus cobalt is about 3 to about 8, and chloride ion in an amount at least equivalent in moles to three times the amount of cobalt plus two times the amount of nickel plus one time the amount of ammonium ion. For the present invention to be operable for the separation of cobalt and nickel, it is necessary that all metal must originally be in solution. It is generally true that ammine divalent cobalt chloride derivatives are more soluble in aqueous media than similar divalent nickel derivatives. Thus ordinarily no great problem exists in providing aqueous ammoniacal chloride solutions of divalent cobalt over the cobalt range specified. The solubility of the ammoniacal nickel chloride compounds which are formed in the aforedescribed aqueous solutions depends at least upon three factors, the concentration of copresent ammonium chloride, the concentration of ammonia (either free or in the form of ammine complex salt) and the temperature. Basically as the concentration of ammonium chloride increases, the solubility of the nickel ammine chloride decreases. At about 25°C. the amount of nickel in solution in an ammoniacal chloride solution where ammonia is present in an amount just about sufficient to form nickel II hexammine chloride depends upon the ammonium chloride content as set forth in Table I.

TABLE I

| $NH_4Cl$ (gpl) | Nickel in Solution (gpl) |
|---|---|
| 0 | about 35 |
| 50 | about 27 |
| 100 | about 21 |
| 200 | 10.6 |
| 250 | 8.4 |
| about 300 | 7.2 |
| about 350 | 6.8 |

A similar situation exists with respect to free ammonia. Solutions usable in accordance with the present invention have been specified to contain at most an amount of ammonia only just slightly more than sufficient to form the metal hexammine complex. Additional ammonia will result in a situation where only small amounts of nickel are soluble in the aqueous media even at favorable ammonium chloride and temperature levels. For example, when ammonia is in about 100% excess of that required to form nickel hexammine chloride and 200 gpl of ammonium chloride also present in solution only about 2 grams per liter of nickel are soluble in the aqueous solution at room temperature. Increase of temperature increases the solubility of nickel ammine chlorides, the solubility increasing up to three or fourfold when the temperature is raised from about 25° to 90°C. Higher temperatures, however, promote loss of ammonia from solutions exposed to the atmosphere and thus care must be taken to prevent undue loss of ammonia when the process of the present invention is carried out at elevated temperatures. The solubility of nickel as hexammine chloride in various aqueous solutions containing ammonium chloride and held at a temperature of about 62°C is set forth in Table II.

TABLE II

| NH₄Cl(gpl) | Nickel in Solution (gpl) |
|---|---|
| 0 | about 62 |
| 50 | about 45 |
| 100 | about 37 |
| 200 | 14.0 |
| 250 | 11.0 |
| 300 | 16.0 |
| 350 | 15.6 |

A comparison of Table I and Table II shows that at temperatures above room temperature the solubility of nickel hexammine chloride in aqueous media has increased to the point where 50 grams per liter of nickel can be copresent in solutions, also containing about 25 grams per liter of ammonium chloride. While this is safely in excess of the minimum 10 grams per liter of ammonium chloride required by applicants, it must also be remembered that copresent cobalt will depress the solubility of nickel hexammine chloride. Accordingly solutions containing the maximum of both nickel and cobalt (50 grams per liter each) are stable as ammine salts only when the minimum amounts of ammonia and ammonium chloride are both copresent in the solutions treated as in the present invention.

The solutions can also contain alkali metal such as sodium or potassium advantageously present as the chloride to constitute a source of chloride ion. The pH of the ammine solution treated in accordance with the present invention is usually about 6 to about 10. Those skilled in the art will appreciate that while solutions treatable in accordance with the present invention can contain other metals, e.g., copper, the solutions will usually be substantially free of iron and similarly hydrolysable metal ions because of the relatively high pH. When operating at atmospheric pressure and using either air or oxygen as an oxidant, it is advantageous to operate at about room temperature, for example, about 20° to about 30°C. After the ammine solution has been oxidized for a period of time, for example, about 5 to about 30 minutes, the solution is then heated to a temperature of about 80°C. Upon heating to about 80°C., a red precipitate, having the formula equivalent to a trivalent cobalt chloropentammine chloride, forms. Usually this precipitate contains only a portion of the cobalt present in solution. In order to precipitate additional cobalt it is necessary to repeat the cycle of oxidizing plus heating at least once and advantageously a number of times.

When either superatmospheric pressure oxygen or superatmospheric pressure air is used as the oxidizer, it is advantageous to operate at a temperature of about 90° to about 110°C. in a pressure vessel in which a pressure of about 2 to about 10 atmospheres of oxygen can be maintained above the solution. For practical purposes, it is advantageous to avoid temperatures in excess of about 120°C. because precipitates formed at higher temperatures tend to be slow settling and difficulty filterable. At temperatures up to about 105°C. the precipitate formed is fast settling, for example, it has a settling rate of about 5 meters per hour and has a ratio of cobalt to nickel of the order of about 200:1.

After a significant amount of cobalt has been removed from ammine solutions containing an amount of chloride ion at least equal in moles to 3 times the cobalt and 2 times the nickel and one time the ammonium ion present in the solution, nickel can be pecipitated by adding ammonia to raise the pH to a value of about 8 to about 9.5 depending on the desired residual concentration of nickel in solution after partial nickel precipitation. Advantageously, ammonia is passed into the solution at a temperature of about 25°C. This procedure raises the amount of ammonia in the solution and causes the solution to become saturated with respect to nickel hexammine chloride whereupon nickel hexammine chloride precipitates. Typically, one can expect ratios of nickel to cobalt in the nickel precipitate of approximately 100:1. Resolution and reprecipitation of the nickel as nickel hexammine chloride results in ratios of nickel to cobalt of at least about 200:1.

In order to give those skilled in the art a better understanding and appreciation of the invention, the following Examples are given.

EXAMPLE I

An aqueous solution containing 20 gpl of nickel as nickel chloride, 2 to 4 gpl of cobalt as cobaltous chloride, 30 to 36 gpl of ammonia and 250 gpl of ammonium chloride was subjected to air oxidation at 25°C. and atmospheric pressure for 15 minutes and then heated to 80°c. and held for 30 minutes. A red precipitate having the formula of trivalent cobalt chloropentammine chloride was formed. The solution was then filtered, the filtrate cooled to 25°C. and the cycle repeated to precipitate additional cobalt. Four cycles are required to precipitate approximately 50 to 65% of the cobalt in the solution as set forth above.

EXAMPLES 2 to 5

Cobalt was simultaneously oxidized and precipitated from an aqueous solution containing 1.95 gpl of cobalt, 16 gpl of nickel, 27 gpl of ammonia and 25 gpl of ammonium chloride by treatment with oxygen at temperatures in the range of about 60° to about 128°C. The treatment with oxygen was carried out in a pressure vessel at a total gas pressure of 13 atmospheres with the oxygen pressure being about 10 to 12 atmospheres. Table III contains the temperature at which the simultaneous oxidation and precipitation took place together with amounts of cobalt in grams per liter remaining in solution after 20, 40 and 60 minutes of treatment.

TABLE III

| Example | 2* | 3 | 4 | 5 | A |
|---|---|---|---|---|---|
| Temperature °C | 60 | 65 | 85 | 105 | 128 |
| Cobalt (20 min.) | 1.53 | 1.65 | 1.60 | 1.07 | 1.76 |
| Cobalt (40 min.) | 1.43 | 1.51 | 1.41 | 0.81 | 1.75 |
| Cobalt (60 min.) | 1.41 | 1.35 | 1.25 | 0.62 | 1.40 |

*Aqueous solution had 5 grams per liter of charcoal dispersed therein

The data in Table III shows that a temperature of about 105°C., e.g., about 90° to about 110°C., is highly advantageous for carrying out the present invention. It is to be noted that even though cobalt recovery at 128°C. (Example A outside the scope of the present invention) is approximately equivalent to the recovery at 60°C., the precipitate formed at 128°C. is slow settling and very difficult to handle.

EXAMPLE 6

An aqueous solution essentially identical to that solution treated in Examples 2 to 5 was held at 92°C. under an oxygen pressure of 8 atmospheres (total pressure 9 atmospheres) for three hours whereby 75% of the cobalt present precipitated as trivalent cobalt chloropentammine chloride analyzing 23.4% cobalt and 0.1% nickel. The filtrate was then treated with ammonia at 25°C. until the pH was 8.6. Approximately 70% of the nickel precipitated as nickel hexammine chloride analyzing 24.5% nickel and 0.2% cobalt. Table IV contains data showing the percentage distribution of species in the solutions and precipitates.

TABLE IV

| Material | Co% | Ni% | $NH_4Cl$% | $NH_3$% |
|---|---|---|---|---|
| Pregnant solution with ammonia added | 100 | 100 | 100 | 100 |
| Cobalt precipitate | 74.9 | 0.02 | 0.25 | 2.8 |
| Nickel precipitate | 4.6 | 69.5 | 0 | 59.0 |
| Barren solution | 20.5 | 30.4 | 99.75 | 38.2 |

The data in Table IV shows that the process of the present invention is effective in separating from ammoniacal solutions large amounts of nickel and cobalt in relatively pure form. Additional nickel and cobalt can be recovered by concentrating or recycling the barren solution. Further, the nickel precipitate can be dissolved in water and recrystallized to provide a purer product.

EXAMPLE 7

Nickel hexammine chloride precipitated from a cobalt-containing solution and containing cobalt and nickel in a ratio of 1 to 11.9 was dissolved in aqueous ammonium chloride solution to provide a solution having a pH of 8.0. After addition of sufficient ammonia to give a pH of 8.6 a precipitate of nickel hexammine chloride was obtained having a ratio of cobalt to nickel of 1 to 97. After a second such dissolution and precipitation the resulting precipitate had a ratio of cobalt to nickel of 1 to 230.

EXAMPLE 8

An aqueous chloride solution containing 12 grams per liter each of cobalt and nickel as the chloride 256.9 grams per liter of ammonium chloride, 134 milliliters of concentrated $NH_4OH$ and 621 milliliters of water was oxidized for 2 hours at a temperature of 105°C. with an oxygen over pressure of 8.6 atmospheres. After filtration the filtrate and wash was found to contain 99.2% of the nickel and the precipitate was found to contain 93.8% of the cobalt present as cobalt chloropentammine chloride.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for precipitating cobalt values from an aqueous ammine solution comprising providing an aqueous solution containing about 0.5 to about 50 gpl of divalent cobalt, about 0.5 to about 50 gpl of nickel, a complementary amount of chloride ion stoichiometrically equivalent to the nickel and cobalt in the divalent state, ammonia in a molar amount of about 3 to about 8 times the molar amount of total nickel plus cobalt and about 10 to about 350 gpl of ammonium chloride, the amounts of the ammonia and ammonium chloride being controlled such that all the nickel and divalent cobalt are soluble in the aqueous solution, oxidizing cobalt in said solution to the trivalent state using a gaseous oxidant containing molecular oxygen and precipitating trivalent cobalt chloropentammine chloride by maintaining the temperature of said aqueous ammine solution at about 60° to about 120°C. during the precipitation operation.

2. A process as in claim 1 wherein the oxidation and precipitation are carried out simultaneously.

3. A process as in claim 1 wherein the oxidation and precipitation are carried out sequentially by oxidizing cobalt with air or oxygen or mixtures thereof at atmospheric pressure at 20° to 30°C. and then raising the temperature to at least 60°C. to precipitate the cobalt salt.

4. A process as in claim 2 wherein the temperature is maintained at about 150°C. with an oxygen overpressure of about 2 to about 10 atmospheres.

5. A process as in claim 1 wherein following precipitation of cobalt, ammonia is added to the solution to precipitate nickel hexammine chloride.

6. A process as in claim 5 wherein the nickel hexammine chloride is redissolved and reprecipitated to provide an essentially cobalt-free nickel-containing precipitate.

7. A process as in claim 6 wherein the nickel hexammine chloride is dissolved in an aqueous ammonium chloride solution and reprecipitated by adding ammonia to said solution.

* * * * *